United States Patent
Saga

(10) Patent No.: US 7,999,018 B2
(45) Date of Patent: Aug. 16, 2011

(54) THERMOPLASTIC RESIN COMPOSITION HAVING ELECTROMAGNETIC INTERFERENCE SHIELDING PROPERTIES

(75) Inventor: Yuji Saga, Tochigi (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 471 days.

(21) Appl. No.: 12/148,873

(22) Filed: Apr. 23, 2008

(65) Prior Publication Data

US 2008/0269378 A1    Oct. 30, 2008

Related U.S. Application Data

(60) Provisional application No. 60/925,945, filed on Apr. 24, 2007.

(51) Int. Cl.
*C08K 5/04* (2006.01)

(52) U.S. Cl. .......... 524/35; 524/435; 524/413; 524/402; 524/436; 524/437; 524/502; 524/612; 524/566; 524/599; 524/556

(58) Field of Classification Search .................... 524/35, 524/435, 413, 402, 436, 437, 502, 612, 566, 524/599, 556

See application file for complete search history.

(56) References Cited

U.S. PATENT DOCUMENTS

| 4,118,372 A | 10/1978 | Schaefgen |
| 6,995,205 B2 * | 2/2006 | Matsukawa et al. .......... 524/439 |
| 2006/0247352 A1 | 11/2006 | Bormashenko et al. |

FOREIGN PATENT DOCUMENTS

| JP | HEI6 196884 | 7/1994 |
| JP | HEI 6 240049 | 8/1994 |
| JP | HEI 9 87417 | 3/1997 |
| WO | WO03/054087 | 7/2003 |

OTHER PUBLICATIONS

Japan Abstract WO 2003/029352—Agari Y, et al.
Abstract TW 550 155 A (Jou W). Sep. 1, 2003.

* cited by examiner

Primary Examiner — Robert D. Harlan

(57) ABSTRACT

A thermoplastic resin composition having good electromagnetic shielding properties and high stiffness comprising thermoplastic polymer, metal alloy having a melting point of between about 200° C. and 500° C.

19 Claims, No Drawings

THERMOPLASTIC RESIN COMPOSITION HAVING ELECTROMAGNETIC INTERFERENCE SHIELDING PROPERTIES

CROSS REFERENCE TO RELATED APPLICATIONS

This application claims the benefit of priority to U.S. Provisional Application No. 60/925,945, filed Apr. 24, 2007.

FIELD OF THE INVENTION

The present invention relates to thermoplastic resin compositions having good electromagnetic shielding properties and high stiffness

BACKGROUND OF THE INVENTION

Many electrical and electronic devices generate radio frequency or other electromagnetic radiation during operation. It is often desirable to shield such devices with an electrically conductive material to prevent consequent electromagnetic interference (EMI) with other devices. Traditionally, electrically conductive materials have been restricted to metals, but polymeric materials frequently offer superior properties (such as low weight and corrosion resistance) and greater design flexibility than metals and it would thus be desirable in many cases to make parts for such applications from electrically conductive polymer resins.

JP H06-240049 A discloses a thermoplastic resin composition comprising 3 to 30 weight percent carbon fiber having a diameter of 1-6 μm and 0 to 20 weight percent carbon black.

JP H09-87417 A discloses a conductive thin molded article having excellent conductivity and sufficient rigidity for use as a casing material, even when molded into articles having a thickness of 2 mm or less. The article comprises a conductive composite material in which conductive fibers and carbon black are compounded with a matrix resin consisting primarily of a thermoplastic resin. The average length of conductive fibers in the molded article is 0.5 mm or more.

WO 2003/029352 and U.S. Pat. No. 6,995,205 B2 disclose a highly thermally conductive resin composition having a high thermal conductivity and good moldability. The composition comprises at least 40 volume percent of a matrix resin, 10-55 volume percent of a thermally conductive filler, and a metal alloy having a melting of 500° C. or less that binds the thermally conductive filler particles to each other. The volume ratio of the metal alloy and thermally conductive filler ranges from 1:30 to 3:1.

JP H06-196884 A discloses resin compositions comprising a filler (such as a metal, alloy, or ceramic) having a high thermal conductivity dispersed in a matrix resin. The composition further comprises a low-melting-point metal alloy. When an article comprising the composition is heated at a temperature at which the low-melting-point metal alloy is completely melted, the alloy is fused with the filler particles, cross-linking them.

SUMMARY OF THE INVENTION

There is disclosed and claimed herein a thermoplastic resin composition comprising:
(a) about 30 to about 78 volume percent of at least one thermoplastic polymer;
(b) about 2 to about 20 volume percent of at least one metal alloy having a melting point of between about 200° C. and 500° C.; and
(c) greater than 20 to about 50 volume percent of carbon fibers, wherein the volume percentages are based on the total volume of the composition.

DETAILED DESCRIPTION OF THE INVENTION

The composition of the present invention comprises at least one thermoplastic polymer, at least one metal alloy having a melting point of between about 200° C. and about 500° C., and carbon fibers.

Examples of suitable thermoplastic polymers include, but are not limited to, polyamides, polyesters (including aromatic polyesters and aliphatic polyesters), liquid crystalline polymers, poly(phenylene sulfide)s, polyacetals, polyimides, polyether imides, polyolefins (such as polyethylene and polypropylene), polycarbonates, acrylonitrile-butadiene-styrene polymers (ABS), poly(phenylene oxide)s, polysulphones, polyether sulfones, polyarylates, polyetheretherketones (PEEK), polyetherketoneketones (PEKK), polystyrenes, and syndiotactic polystyrenes. Preferred are polyesters and polyamides.

Preferred thermoplastic polyesters include polyesters having an inherent viscosity of 0.3 or greater and that are, in general, linear saturated condensation products of diols and dicarboxylic acids, or reactive derivatives thereof. Preferably, they will comprise condensation products of aromatic dicarboxylic acids having 8 to 14 carbon atoms and at least one diol selected from the group consisting of neopentyl glycol; cyclohexanedimethanol; 2,2-dimethyl-1,3-propane diol and aliphatic glycols of the formula $HO(CH_2)_nOH$ where n is an integer of 2 to 10. Up to 20 mole percent of the diol may be an aromatic diol such as ethoxylated bisphenol A, sold under the tradename Dianol 220 by Akzo Nobel Chemicals, Inc.; hydroquinone; biphenol; or bisphenol A. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms. Copolymers may be prepared from two or more diols or reactive equivalents thereof and at least one dicarboxylic acid or reactive equivalent thereof or two or more dicarboxylic acids or reactive equivalents thereof and at least one diol or reactive equivalent thereof. Difunctional hydroxy acid monomers such as hydroxybenzoic acid or hydroxynaphthoic acid or their reactive equivalents may also be used as comonomers.

Preferred polyesters include poly(ethylene terephthalate) (PET), poly(1,4-butylene terephthalate) (PBT), poly(propylene terephthalate) (PPT), poly(1,4-butylene naphthalate) (PBN), poly(ethylene naphthalate) (PEN), poly(1,4-cyclohexylene dimethylene terephthalate) (PCT) and mixtures of the foregoing. Also preferred are 1,4-cyclohexylene dimethylene terephthalate/isophthalate copolymer and other linear homopolymer esters derived from aromatic dicarboxylic acids, including isophthalic acid; bibenzoic acid; naphthalenedicarboxylic acids including the 1,5-, 2,6-, and 2,7-naphthalenedicarboxylic acids; 4,4'-diphenylenedicarboxylic acid; bis(p-carboxyphenyl) methane; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic) acid, and glycols selected from the group consisting of 2,2-dimethyl-1,3-propane diol; neopentyl glycol; cyclohexane dimethanol; and aliphatic glycols of the general formula $HO(CH_2)_nOH$ where n is an integer from 2 to 10, e.g., ethylene glycol; 1,3-trimethylene glycol; 1,4-tetramethylene glycol; -1,6-hexamethylene glycol; 1,8-octamethylene glycol; 1,10-decamethylene glycol; 1,3-propylene glycol; and 1,4-butylene glycol. Up to 20 mole percent, as indicated above, of repeat units derived from one or more aliphatic acids, including adipic, sebacic, azelaic, dodecanedioic acid or 1,4-cyclohexanedicarboxylic acid can be present. Also preferred are copolymers derived from 1,4-butanediol, ethoxylated bisphenol A, and terephthalic acid or reactive equivalents thereof. Also preferred are random copolymers of at least two of PET, PBT, and PPT, and mixtures of at least two of PET, PBT, and PPT, and mixtures of any of the forgoing.

The thermoplastic polyester may also be in the form of copolymers that contain poly(alkylene oxide) soft segments. The poly(alkylene oxide) segments are to be present in about 1 to about 15 parts by weight per 100 parts per weight of thermoplastic polyester. The poly(alkylene oxide) segments have a number average molecular weight in the range of about 200 to about 3,250 or, preferably, in the range of about 600 to about 1,500. Preferred copolymers contain poly(ethylene oxide) incorporated into a PET or PBT chain. Methods of incorporation are known to those skilled in the art and can include using the poly(alkylene oxide) soft segment as a comonomer during the polymerization reaction to form the polyester. PET may be blended with copolymers of PBT and at least one poly(alkylene oxide). A poly(alkyene oxide) may also be blended with a PET/PBT copolymer. The inclusion of a poly(alkylene oxide) soft segment into the polyester portion of the composition may accelerate the rate of crystallization of the polyester.

Examples of aliphatic polyesters include, but are not limited to poly(epsilon-caprolactam), poly(lactic acid), poly(butylene succinate), and poly(ethylene succinate).

Suitable polyamides can be condensation products of dicarboxylic acids or their derivatives and diamines, and/or aminocarboxylic acids, and/or ring-opening polymerization products of lactams. Suitable dicarboxylic acids include adipic acid, azelaic acid, sebacic acid, dodecanedioic acid, isophthalic acid, and terephthalic acid. Suitable diamines include tetramethylenediamine, hexamethylenediamine, octamethylenediamine, nonamethylenediamine, dodecamethylenediamine, 2-methylpentamethylenediamine, 2-methyloctamethylenediamine, trimethylhexamethylenediamine, bis(p-aminocyclohexyl)methane, m-xylylenediamine, and xylylenediamine. A suitable aminocarboxylic acid is 11-aminododecanoic acid. Suitable lactams include caprolactam and laurolactam.

Suitable polyamides include aliphatic polyamides such as polyamide 6; polyamide 6,6; polyamide 4,6; polyamide 6,9; polyamide 6,10; polyamide 6,12; polyamide 10,10; polyamide 11; polyamide 12; semi-aromatic polyamides such as poly(m-xylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), the copolyamide of hexamethylene terephthalamide and hexamethylene adipamide (polyamide 6,T/6,6); the copolyamide of hexamethyleneterephthalamide and 2-methylpentamethyleneterephthalamide (polyamide 6,T/D,T); the copolyamide of hexamethylene isophthalamide and hexamethylene adipamide (polyamide 6,1/6,6); the copolyamide of hexamethylene terephthalamide, hexamethylene isophthalamide, and hexamethylene adipamide (polyamide 6,T16,116,6) and mixtures of these polymers.

Examples of suitable aliphatic polyamides include polyamide 6,6/6 copolymer; polyamide 6,6/6,8 copolymer; polyamide 6,6/6,10 copolymer; polyamide 6,6/6,12 copolymer; polyamide 6,6/10 copolymer; polyamide 6,6/12 copolymer; polyamide 6/6,8 copolymer; polyamide 6/6,10 copolymer; polyamide 6/6,12 copolymer; polyamide 6/10 copolymer; polyamide 6/12 copolymer; polyamide 6/6,6/6,10 terpolymer; polyamide 6/6,6/6,9 terpolymer; polyamide 6/6,6/11 terpolymer; polyamide 6/6,6/12 terpolymer; polyamide 6/6,10/11 terpolymer; polyamide 6/6,10/12 terpolymer; and polyamide 6/6,6/PACM (bis-p-[aminocyclohexyl]methane) terpolymer.

By a "liquid crystalline polymer" (abbreviated "LCP") is meant a polymer that is anisotropic when tested using the TOT test or any reasonable variation thereof, as described in U.S. Pat. No. 4,118,372, which is hereby included by reference. Useful LCP's include polyesters, poly(ester-amides), and poly(ester-imides). One preferred form of LCP is "all aromatic", that is all of the groups in the polymer main chain are aromatic (except for the linking groups such as ester groups), but side groups that are not aromatic may be present.

Preferred LCP's are polyester and poly(ester-amide) LCP's. These polymers typically contain repeat units derived from aromatic hydroxycarboxylic acids, aromatic dicarboxylic acids, aliphatic dicarboxylic acids, aromatic diols, aliphatic diols, aromatic hydroxyamines, aromatic diamines, and the like. Examples include aromatic polyesters obtained by polymerizing one or two or more aromatic hydroxycarboxilic acids; aromatic polyesters obtained by polymerizing aromatic hydroxycarboxylic acids as the main ingredient, and one or more aromatic dicarboxylic acids and one or more aromatic diols; aromatic polyesters obtained by polymerizing one or more aromatic dicarboxylic acids and one or more aromatic diols; aromatic polyester amides obtained by polymerizing aromatic hydroxyamines, one or two or more aromatic diamines, and one or two or more aromatic hydroxycarboxylic acids; aromatic polyester amides obtained by polymerizing aromatic hydroxyamines, one or two or more aromatic diamines, one or two or more aromatic hydroxycarboxylic acids, aromatic dicarboxylic acids, and one or two or more aliphatic carboxylic acids; and aromatic polyester amides obtained by polymerizing aromatic hydroxyamines, one or two or more aromatic diamines, one or two or more aromatic hydroxycarboxylic acids, aromatic dicarboxylic acids, one or two or more aliphatic carboxylic acids, aromatic diols, and one or two or more aliphatic diols.

Examples of aromatic hydroxycarboxylic acids include 4-hydroxybenzoic acid, 3-hydroxybenzoic acid, 2-hydroxybenzoic acid, 6-hydroxy-2-naphthoic acid, 5-hydroxy-2-naphthoic acid, and halogen, alkyl, and allyl substituted hydroxybenzoic acids.

Examples of aromatic dicarboxylic acids include terephthalic acid; isophthalic acid; 3,3'-diphenyldicarboxylic acid; 4,4'-diphenydicarboxylic acid; 1,4-naphthalenedicarboxylic acid; 1,5-naphthalenedicarboxylic acid; 2,6-naphthalenedicarboxylic acid; and alkyl- and halogen-substituted dicarboxylic acids, such as t-butylterephthalic acid and chlorterephthalic acid. Examples of aliphatic dicarboxylic acids include cyclic aliphatic dicarboxylic acids, such as trans-1,4-cyclohexanedicarboxylic acid; cis-1,4-cyclohexanedicarbxylic acid; 1,3-cyclohexanedicarboxylic acid; and substituted derivatives thereof.

Examples of aromatic diols include hydroquinone; bisphenol; 4,4'-dihydroxydiphenyl ether; 3,4'-dihydroxydiphenyl ether; bisphenol-A; 3,4'-dihydroxydiphenyl methane; 3,3'-dihydroxydiphenyl methane; 4,4'-dihydroxydiphenylsulfone; 3,4'-dihydroxydiphenylsulfone; 4,4'-dihydroxydiphenyl sulfide; 3,4'-dihydroxydiphenyl sulfide; 2,6'-naphthalenediol; 1,6'-naphthalenediol; 4,4'-dihydroxybenzophenone; 3,4'-dihydroxybenzophenone; 3,3'-dihydroxybenzophenone; 4,4'-dihydroxydiphenyl dimethyl silane; and alkyl- and halogen-substituted derivatives thereof. Examples of the aliphatic diols include cyclic, linear, and branched aliphatic diols, such as trans-1,4-hexanediol; cis-1,4-hexanediol; trans-1,3-cyclohexanediol; cis-1,2-cyclohexanediol; ethylene glycol; 1,4-butanediol; 1,6-hexanediol; 1,8-octanediol; trans-1,4-cyclohexanedimethanol; cis-1,4-cyclohexanedimethanol; and cis-1,4-cyclohexanedimethanol; and substituted derivatives thereof. Examples of aromatic hydroxylamines and aromatic diamines include 4-aminophenol; 3-aminophenol; p-phenylenediamine; m-phenylenediamine, and substituted derivatives thereof.

The thermoplastic polymer may be present in about 30 to about 78 volume percent or about 30 to about 88 volume percent, based on the total volume of the composition. The thermoplastic polymer is preferably present in about 40 to about 80 volume percent of the composition, based on the total volume of the composition.

The metal alloy has a melting point of between about 200° C. and about 500° C., or preferably between about 220° C. and about 400° C. It is preferred that the metal alloy be selected such that it is in a semi-molten state at the melting temperature of the polymer.

Examples of metal alloys include Sn alloys such as Sn—Cu, Sn—Al, Sn—Zn, Sn—Te, Sn—Pt, Su-P, Sn—Mn, Sn—Ag, Sn—Ca, Sn—Mg, Sn—Au, Sn—Ba, and Sn—Ge; and Li alloys such as Al—Li, Cu—Li, and Zn—Li. Preferred alloys having melt points of 400° C. or lower include Sn—Cu, Sn—Al, Sn—Zn, Sn—Pt, Sn—Mn, Sn—Ag, Sn—Au, Al—Li, and Zn—Li. More preferred are Sn—Cu, Sn—Al, and Sn—Zn, which are easily obtainable and low in cost. It is even more preferable to use Sn—Cu alloys, as they are available with a range of melting points and have high thermal conductivities.

The metal alloy is present in about 2 to about 20 volume percent of the composition, based on the total volume of the composition. The metal alloy is preferably present in about 3 to about 10 volume percent of the composition, based on the total volume of the composition.

The carbon fibers can be any type, including, for example, those made from polyacrylonitrile (PAN), pitch, and/or cellulose fibers, or they may be made using a gas-phase growth method. The carbon fibers may also be in the form of carbon nanotubes. PAN carbon fibers are preferred.

The carbon fibers may be modified with a sizing agent, such as epoxy resins, urethane-modified epoxy resins, polyurethane resins, and polyamide resins. The sizing agent may be applied to the carbon fibers using any method known in the art.

In one embodiment of the present invention, the carbon fibers are present in greater than 20 to about 50 volume percent, or preferably in 25 to about 50 volume percent, or more preferably 30 to about 50 volume percent based on the total volume of the composition.

In a second embodiment of the present invention, the carbon fibers are present in about 10 to about 50 volume percent, or preferably in about 15 to about 50 volume percent, or more preferably 15 to about 40 volume percent based on the total volume of the composition. In this embodiment, the carbon fibers have a thermal conductivity of less than 100 W/mK, or preferably of less than about 70 W/mK, or more preferably of less than about 50 W/mK.

The composition may optionally further comprise powders of at least one metal, where the metal is not a metal alloy having a melting point of between about 200° C. and about 500° C. Examples of suitable metals include iron, copper, tin, nickel, aluminum, magnesium, titanium, chromium, zinc, gold, silver, etc. Copper is preferred. The optional metal powders may be present in 0 to about 20 volume percent, or preferably in about 0.5 to about 20 volume percent, or more preferably in about 1 to about 10 volume percent based on the total volume of the composition.

The composition of this invention may optionally contain one or more additional fillers, such as mineral fillers. Examples of fillers are glass fibers, talc, mica, kaolin, wollastonite, and calcium carbonate. The optional one or more fillers are present in 0 to about 30 volume percent, or preferably in about 1 to about 30 volume percent, based on the total volume of the composition.

The composition may further contain additional additives such as heat stabilizers, ultraviolet ray absorbents, antioxidants, lubricants, nucleating agents, anti-static agents, mold release agents, colorants (such as dyes and pigments), flame retardants, plasticizers, other resins, and the like. Such additives will typically be present in total in up to about 30 volume percent, based on the total volume of the composition.

The composition of the present invention is in the form of a melt-mixed blend, wherein all of the polymeric components are well-dispersed within each other and all of the non-polymeric ingredients are dispersed in and bound by the polymer matrix, such that the blend forms a unified whole. The blend may be obtained by combining the component materials using any melt-mixing method. The component materials may be mixed using a melt-mixer such as a single- or twin-screw extruder, blender, kneader, roller, Banbury mixer, etc. to give a resin composition. Or, part of the materials may be mixed in a melt-mixer, and the rest of the materials may then be added and further melt-mixed. The sequence of mixing in the manufacture of the compositions of the invention may be such that individual components may be melted in one shot, or the filler and/or other components may be fed from a side feeder, and the like, as will be understood by those skilled in the art.

The processing temperature used for the melt-mixing process is selected such that the polymer is molten and the metal alloy is in a semi-molten state in which solid and liquid phases coexist.

The compositions of the present invention may be formed into articles using methods known to those skilled in the art, such as, for example, injection molding, extrusion, blow molding, injection blow molding, compression molding, foaming molding, extrusion, vacuum molding, rotation molding, calendar molding, solution casting, or the like.

The articles may include those for use in electronic and electrical applications such as housings, motor core housings, and secondary battery cases. They may be used as cases or connectors for personal computers, mobile telephones, communications equipment, optical transceivers, electrical and electronic cables, and the like.

The compositions of the present invention have both good EMI shielding and good stiffness.

EXAMPLES

The compositions of Examples 1-3 and Comparative Examples 1-3 were prepared by melt blending the ingredients shown in Table 1 in a kneading extruder at temperatures of about 290-325° C. Upon exiting the extruder, the compositions were cooled and pelletized. The resulting compositions were molded into test pieces for electromagnetic interference shielding testing and flexural modulus testing.

Flexural modulus was determined using ISO test pieces according to ISO 178. Results are given in Table 1.

Electromagnetic shielding was measured by the Advantest method as described in Kogyozairyo (Engineering Materials) (1984) vol. 10, pp. 28-29 on test pieces having dimensions of 100 mm×100 mm×3.2 mm. Results are given in Table 1. High numbers indicate greater EMI shielding.

The following ingredients are shown in Table 1:
PBT is poly(butylene terephthalate) (Crastin® 6131, supplied by E.I. du Pont de Nemours and Co.)
Polyamide 6.6 is Zytel® 101, supplied by E.I. du Pont de Nemours and Co.
Carbon fibers A is PAN carbon fibers having a thermal conductivity of 7 W/mK (Pyrofil® TR06U supplied by Mitsubishi Rayon, Co.).
Carbon fibers B is pitch carbon fibers having a thermal conductivity of 140 W/mK (Dialead® K223QG supplied by Mitsubishi Chemical Functional Products, Inc.).
Carbon fibers C is pitch carbon fibers having a thermal conductivity of 20 W/mK (Dialead® K223SE supplied by Mitsubishi Chemical Functional Products, Inc.).
Graphite is CB-150, supplied by Nippon Graphite Industries, Ltd.
Metal alloy is a Sn—Cu alloy having a melting point of 230° C.

TABLE 1

|  | Example 1 | Comp. Ex. 1 | Comp. Ex 2 | Example 2 | Example 3 | Example 4 | Comp. Ex. 3 |
|---|---|---|---|---|---|---|---|
| PBT | 57 | 57 | 57 | 52 | 52 | 64 | 64 |
| Carbon fibers A | 25 | 33 | — | 30 | — | 18 | — |
| Carbon fibers B | — | — | — | — | 30 | — | 18 |
| Metal alloy | 5 | — | 5 | 5 | 5 | 5 | 5 |
| Glass fibers | 10 | 10 | 10 | 10 | 10 | 10 | 10 |
| Graphite | — | — | 25 | — | — | — | — |
| Copper powder | 3 | — | 3 | 3 | 3 | 3 | 3 |
| Electromagnetic shielding at 100 MHz (dB) | 61 | 45 | 40 | 54 | 54 | 54 | 54 |
| Electromagnetic shielding at 1 GHz (dB) | 70 | 18 | 12 | 70 | 57 | 73 | 29 |
| Flexural modulus (GPa) | 21.0 | 26.6 | 14.2 | 24.3 | 23.6 | 16.3 | 16.2 |

Ingredient qualities are given in volume percent based on the total volume of the composition.

TABLE 2

|  | Example 5 | Example 6 | Comp. Ex. 4 |
|---|---|---|---|
| Polyamide 6,6 | 67 | 67 | 67 |
| Carbon fibers A | 25 | — | — |
| Carbon fibers C | — | 25 | — |
| Metal alloy | 5 | 5 | 5 |
| Glass fibers | — | — | — |
| Graphite | — | — | 25 |
| Copper powder | 3 | 3 | 3 |
| Electromagnetic shielding at 100 MHz (dB) | 56 | 54 | 28 |
| Electromagnetic shielding at 1 GHz (dB) | 62 | 41 | 5 |
| Flexural modulus (GPa) | 17.7 | 15.0 | 12.6 |

Ingredient quantities are given in volume percent based on the total volume of the composition.

What is claimed is:

1. A thermoplastic resin composition comprising:
   (a) about 30 to about 78 volume percent of at least one thermoplastic polymer;
   (b) about 2 to about 20 volume percent of at least one metal alloy having a melting point of between about 200° C. and 500° C., wherein said metal alloy is at least one selected from the group consisting of Sn—Cu, Sn—Al, Sn—Zn, Sn—Te, Sn—Pt, Su—P, Sn—Mn, Sn—Ag, Sn—Ca, Sn—Mg, Sn—Au, Sn—Ba, Sn—Ge, Al—Li, Cu—Li, and Zn—Li; and
   (c) greater than 20 to about 50 volume percent of carbon fibers, having a thermal conductivity of less than 50 W/mK,
wherein the volume percentages are based on the total volume of the composition.

2. The composition of claim 1, wherein (b) is at least one metal alloy having a melting point of between about 200° C. and about 400° C.

3. The composition of claim 1, wherein the carbon fibers (c) comprise polyacrylonitrile fibers, pitch fibers, cellulose fibers, and/or carbon nanotubes.

4. The composition of claim 1, wherein the thermoplastic polymer comprises at least one polyamide.

5. The composition of claim 4, wherein the polyamide is one or more selected from the group consisting of polyamide 6; polyamide 6, 6; polyamide 4, 6; polyamide 6, 9; polyamide 6, 10; polyamide 6, 12; polyamide 10, 10; polyamide 11; polyamide 12; semi-aromatic polyamides such as poly(m-xylylene adipamide) (polyamide MXD, 6), poly(dodecamethylene terephthalamide) (polyamide 12, T), poly(decamethylene terephthalamide) (polyamide 10, T), poly (nonamethylene terephthalamide) (polyamide 9, T), the copolyamide of hexamethylene terephthalamide and hexamethylene adipamide (polyamide 6, T/6, 6); the copolyamide of hexamethyleneterephthalamide and 2-methylpentamethyleneterephthalamide (polyamide 6, T/D, T); the copolyamide of hexamethylene isophthalamide and hexamethylene adipamide (polyamide 6, I/6, 6); and the copolyamide of hexamethylene terephthalamide, hexamethylene isophthalamide, and hexamethylene adipamide (polyamide 6,T/6, I/6, 6), 6. The composition of claim 1, wherein the thermoplastic polymer comprises at least one polyester.

7. The composition of claim 6, wherein the polyester is one or more selected from the group consisting of poly(ethylene terephthalate), poly(1, 4-butylene terephthalate), poly(propylene terephthalate), poly(1, 4-butylene naphthalate), poly (ethylene naphthalate), and poly(1, 4-cyclohexylene dimethylene terephthalate).

8. The composition of claim 1, further comprising powders of at least one metal, where the metal is not a metal alloy having a melting point of between about 200° C. and about 500° C.

9. The composition of claim 8, wherein the metal powders are one or more selected from the group consisting of iron, copper, tin, nickel, aluminum, magnesium, titanium, chromium, zinc, gold, and silver.

10. A thermoplastic resin composition comprising:
(a) about 30 to about 88 volume percent of at least one thermoplastic polymer;
(b) about 2 to about 20 volume percent of at least one metal alloy having a melting point of between about 200° C. and 500° C., wherein said metal alloy is at least one selected from the group consisting of Sn—Cu, Sn—Al, Sn—Zn, Sn—Te, Sn—Pt, Su—P, Sn—Mn, Sn—Ag, Sn—Ca, Sn—Mg, Sn—Au, Sn—Ba, Sn—Ge, Al—Li, Cu—Li, and Zn—Li; and
(c) about 10 to about 50 volume percent of carbon fibers having a thermal conductivity of less than 50 W/mK,
wherein the volume percentages are based on the total volume of the composition.

11. The composition of claim 10, wherein (b) is at least one metal alloy having a melting point of between about 200° C. and about 400° C.

12. The composition of claim 10, wherein the carbon fibers (c) comprise polyacrylonitrile fibers, pitch fibers, cellulose fibers, and/or carbon nanotubes.

13. The composition of claim 10, further comprising powders of at least one metal, where the metal is not a metal alloy having a melting point of between about 200° C. and about 500° C.

14. The composition of claim 13, wherein the metal powders are one or more selected from the group consisting of iron, copper, tin, nickel, aluminum, magnesium, titanium, chromium, zinc, gold, and silver.

15. The composition of claim 10, wherein the thermoplastic polymer comprises at least one polyamide and/or polyester.

16. A article made from the composition of claim 1.

17. The article of claim 16 in the form an electrical or electronic housing, a motor core housing, or secondary battery case.

18. A article made from the composition of claim 10.

19. The article of claim 18 in the form an electrical or electronic housing, a motor core housing, or secondary battery case.

* * * * *